US006769916B1

(12) United States Patent
Montgomery et al.

(10) Patent No.: US 6,769,916 B1
(45) Date of Patent: Aug. 3, 2004

(54) METHODS AND APPARATUS FOR DEMONSTRATING LAWS OF PHYSICAL CHEMISTRY

(76) Inventors: Robert Arthur Montgomery, 4928 Gould Ave., La Canada, CA (US) 91011; Christopher Gordon Snow, 1347 J. Lee Cir., Glendale, CA (US) 91208

( * ) Notice: Subject to any disclaimer, the term of this patent is extended or adjusted under 35 U.S.C. 154(b) by 48 days.

(21) Appl. No.: 10/259,554

(22) Filed: Sep. 27, 2002

(51) Int. Cl.$^7$ .............................................. G09B 23/24
(52) U.S. Cl. ...................... 434/298; 434/276; 434/278; 434/283
(58) Field of Search ................................ 434/276, 278, 434/283, 298

(56) References Cited

U.S. PATENT DOCUMENTS 4,192,084 A * 3/1980 O'Riordan .................. 434/278
4,679,326 A * 7/1987 Takizawa et al. ............. 33/832
5,886,608 A * 3/1999 Chabay ....................... 355/306
6,015,296 A * 1/2000 Fenkanyn et al. ........... 434/301

* cited by examiner

Primary Examiner—Derris H. Banks
Assistant Examiner—Dmitry Suhol

(57) ABSTRACT

This invention is intended to be used as an Educational demonstration for college level instruction. The invention allows students to visualize the phenomenon of activation energy. Rearrange the unit to demonstrate the SN2 reaction and the potential energy of a covalent bond as a function of internuclear distance. The demonstration can be used as a visual aid to enhance the students understanding of the material presented during the instructors lecture time, or the demonstration can be used directly by the student as a laboratory exercise. The student will gain important graphing skills by using this invention to plot the activation energy curve. The device is made with the most powerful ring magnets commercially available. The size and shape of the ring magnets produces the unusual effects that characterize this invention. An acrylic rod, containing a metric scale for easy measurement, aligns the magnets.

13 Claims, 7 Drawing Sheets

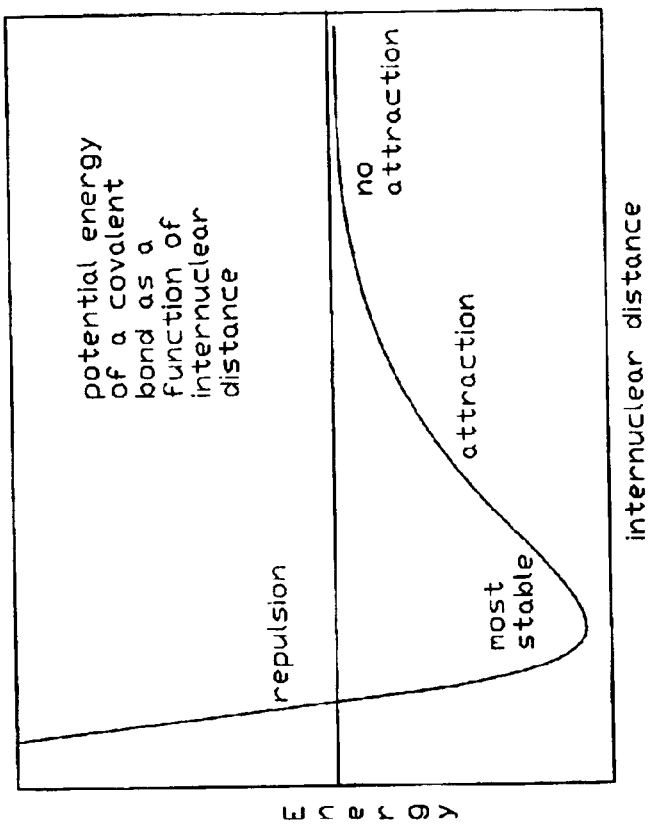
FIG 1
FIG 2
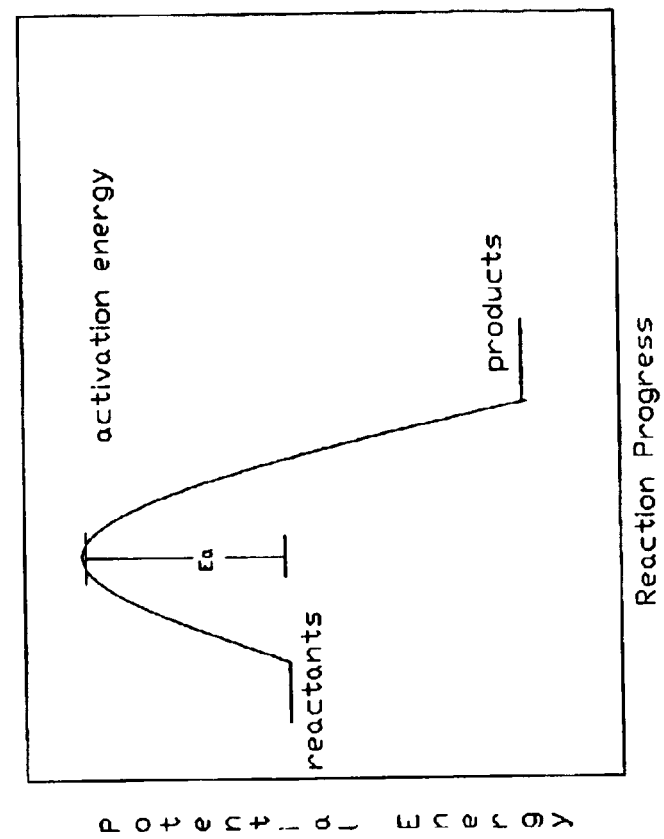
FIG 3

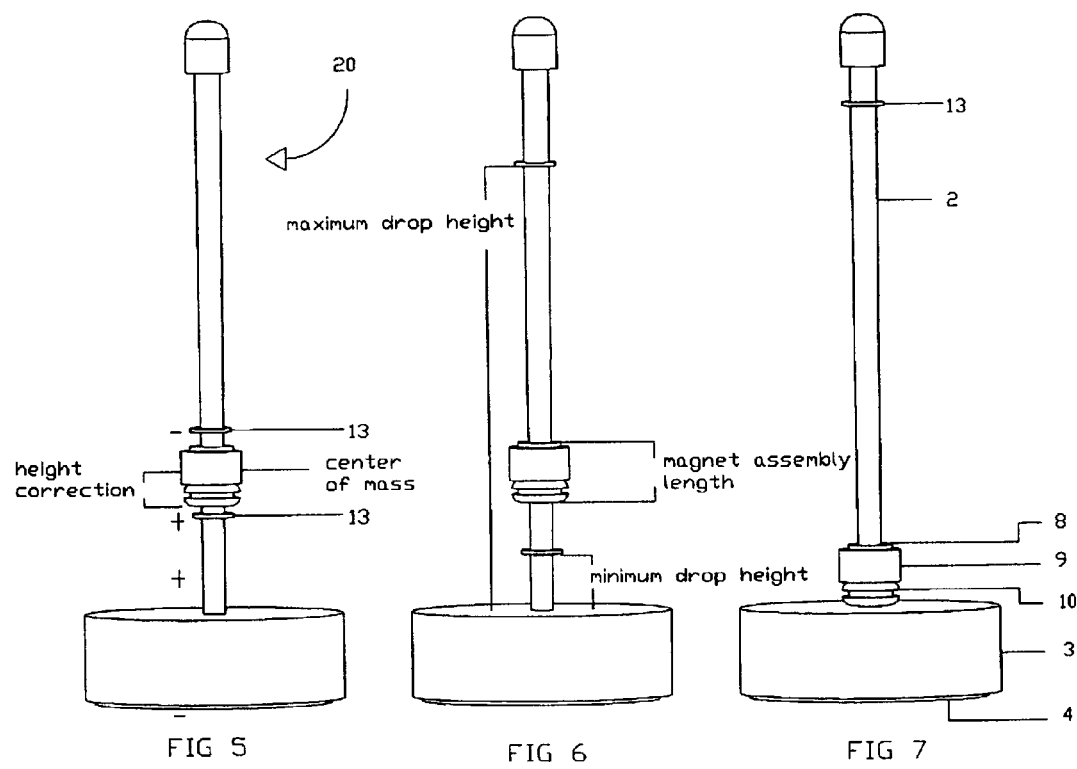

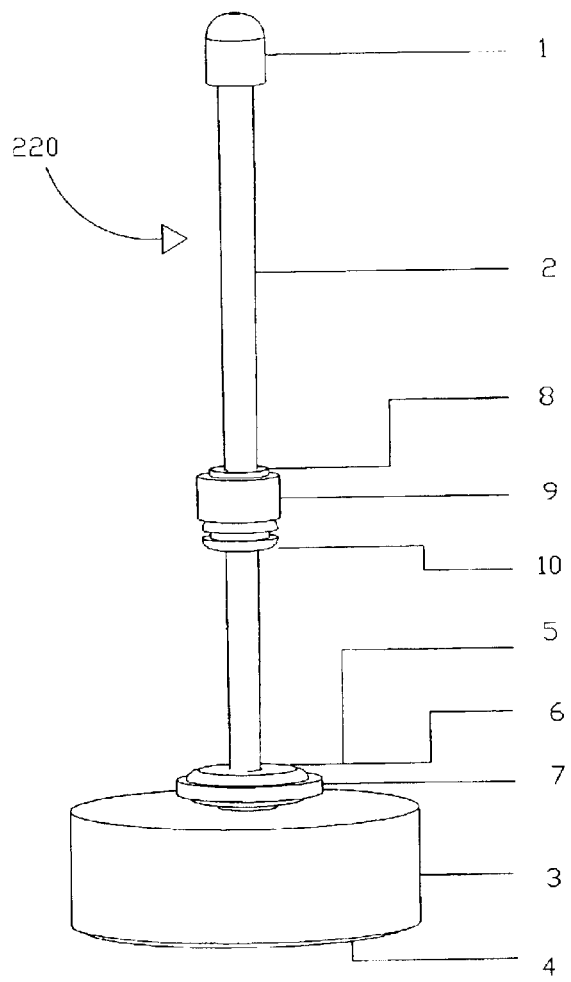
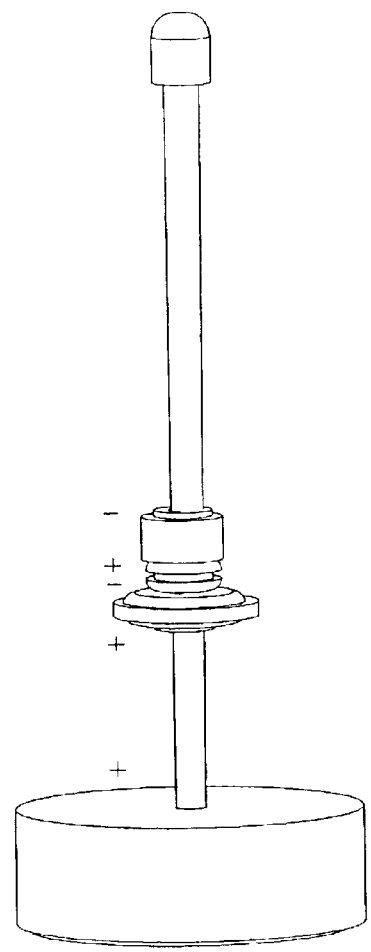
FIG 10
FIG 11

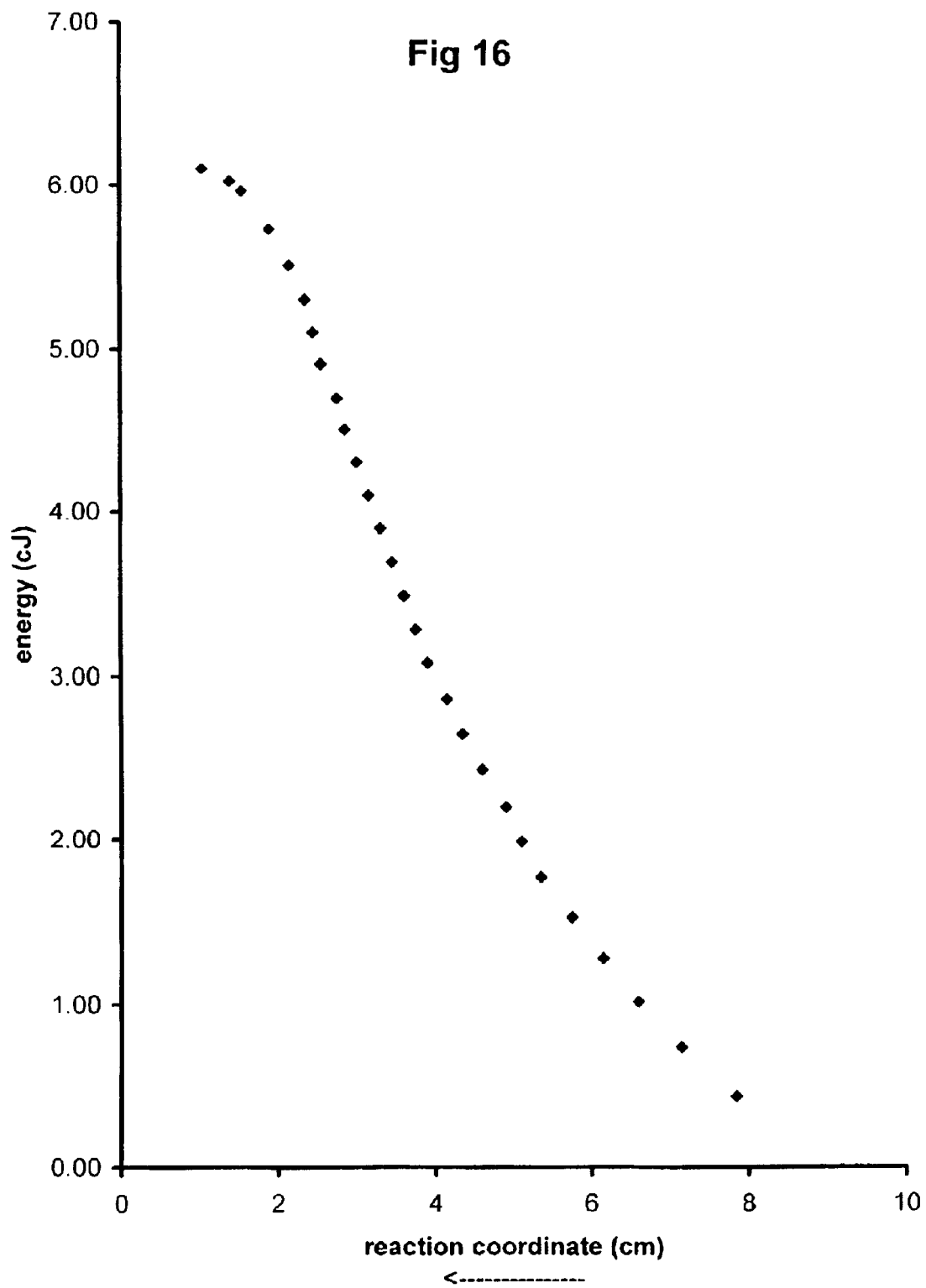

METHODS AND APPARATUS FOR DEMONSTRATING LAWS OF PHYSICAL CHEMISTRY

TECHNICAL FIELD

This invention relates to educational demonstrations, and more specifically to the methods and apparatus used to demonstrate the principles of activation energy, the SN2 reaction, and the potential energy of a covalent bond as a function of internuclear distance.

BACKGROUND OF THE INVENTION

A brief description of activation energy and the SN2 reaction will be discussed followed by a description of the potential energy of a covalent bond as a function of internuclear distance. Even if a chemical reaction is energetically favorable for a reaction to take place, considerable experimental evidence exists showing that if covalent bonds are broken in this reaction, the reactants must go up an energy hill first before the reaction can take place. This phenomenon is referred to as activation energy represented by FIG. 1. In other words energy must be put into the system before a chemical reaction can take place. Any reaction in which bonds are broken will have energy of activation greater than zero. Every thing else held constant, a low energy of activation means a reaction will take place rapidly; a high energy of activation means that a reaction will take place slowly.

An $SN_N2$ reaction is a bimolecular Nucleophilic substitution. The term Bimolecular refers to the observation that two species are involved in the rate-determining step. For example when the concentration of one of the species involved in this type of reaction is doubled the rate of the reaction is also doubled. When the concentration of both species are doubled the rate of the reaction increases by four times. The rate of this reaction is said to be second order overall, hence the name $S_N2$ reaction. The mechanism for this reaction was one based on the ideas proposed by Edward Hughes and Christopher Ingold in 1937 illustrated in FIG. 3. According to this mechanism a nucleophile attacks the carbon bearing the leaving group from the backside. The orbital containing the electron pair of the nucleophile begins to bond with the carbon atom containing the leaving group; consequently, the bond between the carbon atom and the leaving group weakens. As this happens, the carbon atom has its configuration turned inside out, it becomes inverted and the leaving group is pushed away.

Covalent bonds are central to the study of chemistry. FIG. 2 illustrates what happens to the total energy of a system when a covalent bond is formed. For example when two hydrogen atoms combine to form a hydrogen molecule and their electrons with opposite spins are brought closer and closer together. When the atoms are far apart their total energy is that of two isolated hydrogen atoms. As the atoms move closer together each nucleus increasingly attracts the other's electron resulting in a lowering of the energy of the total system; thus the two atoms attract each other. This attraction more than compensates for the repulsive force between the two nuclei. When the two hydrogen atoms finally bond the equilibrium bond length for the hydrogen molecule is formed and the energy of the total system is at its lowest. In other words the most stable energy state is obtained. If the nuclei are moved closer together the repulsion of the two positively charged nuclei predominates, and the energy of the system rises.

SUMMARY OF THE INVENTION

This invention is intended to be used as an Educational demonstration for college level instruction. The invention allows students to visualize the phenomenon of activation energy. Rearrange the unit to demonstrate the SN2 reaction and the potential energy of a covalent bond as a function of internuclear distance. The demonstration can be used as a visual aid to enhance the students understanding of the material presented during the instructors lecture time, or the demonstration can be used directly by the student as a laboratory exercise. The student will gain important graphing skills by using this invention to plot the activation energy curve. The device is made with the most powerful annular magnets commercially available. The size and shape of the annular magnets produces the unusual effects that characterize this invention. An acrylic rod, containing a metric height scale for easy measurement, aligns the magnets.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a graph representing activation energy;

FIG. 2 is a graph representing the potential energy of a covalent bond as a function of internuclear distance;

FIG. 3 represents a mechanism for the $S_N2$ reaction;

FIG. 5 is a perspective view of the setup before beginning the student laboratory graphing exercise;

FIG. 6 is a perspective view of the setup used during the student laboratory exercise;

FIG. 7 is the same view of FIGS. 5 and 6 after completion of the student laboratory exercise;

FIG. 10 is a perspective view of the setup to demonstrate the $S_N2$ reaction;

FIG. 11 is the same view of FIG. 10 after the completion of the exercise;

DETAILED DESCRIPTION OF THE INVENTION

Figure 4:
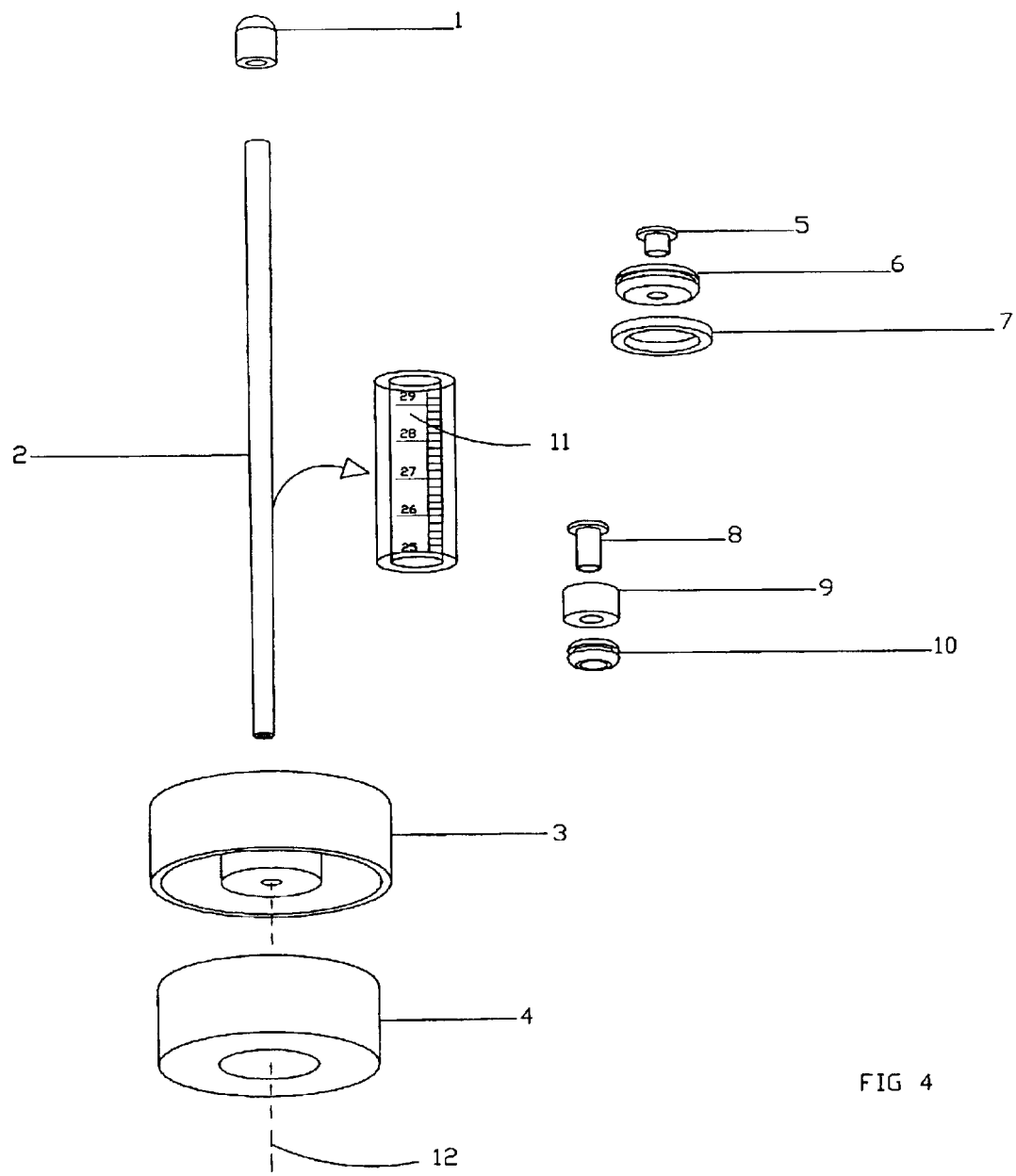
FIG. 4 is a perspective view of each component labeled with a number.

A Method for demonstrating activation energy, including an exercise in graphing the activation energy curve, is illustrated in FIGS. 5, 6, and 7. Setup 20 of the apparatus includes: a first annular magnet 4, having a first pole designated by a plus sign, a second pole designated by a minus sign, and a central axis 12. A transparent rod 2 extending upward from the first annular magnet 4, aligned with the central axis 12. A height scale 11 fitted inside the rod 2. A second annular magnet 9 having a first pole designated by a plus sign, a second pole designated by a minus sign, and a central aperture consisting of a nylon bearing 8 held in place with a second resilient grommet 10 to slidably receive the rod 2. Two washers 13 having an aperture dimensioned to snuggly receive the rod 2, so that the washers 13 may be selectively placed at any position along the rod 2 and remain in the placed position. The washers mark the maximum and minimum heights during the graphing exercise. Refer to FIG. 4 to see each component labeled with a number. The second annular magnet 9 is placed on the rod 2 so that its first pole is disposed toward the first pole of the first annular magnet 4, and the second annular magnet 9 is suspended above the first annular magnet 4. The exercise starts by raising the second annular magnet 9 a height above the first annular magnet 4 and dropping the second annular magnet 9 and observing that the second annular magnet 9 falls toward the first annular magnet 4. This step is repeated wherein for each repetition the height is increased, the repetition continuing until when for the Y-axis, the maximum drop height is subtracted from the minimum drop height. The resulting value is the distance traveled by the second annular magnet 9. Because we are thinking of the second annular magnet 9 as a small particle, the magnet assembly length, about 1.7 (cm), will be subtracted from each of these distance values discussed above. To complete the exercise, the mass of the second annular magnet 9.018 (Kg) and the acceleration due to gravity 9.8 (m/s^2) are multiplied by the distance values discussed above to obtain a value of energy in centiJoules. In other words, referring again to table 1, the values of columns A, B and C are subtracted from each other and those resulting values are multiplied by the values in columns E and F. Knowing the X and Y values, one can plot the curve illustrated in FIG. 16. Note the results illustrate only the repulsion portion of the activation energy curve, and the reaction coordinate moves from right to left.

TABLE 1

Figure 8:
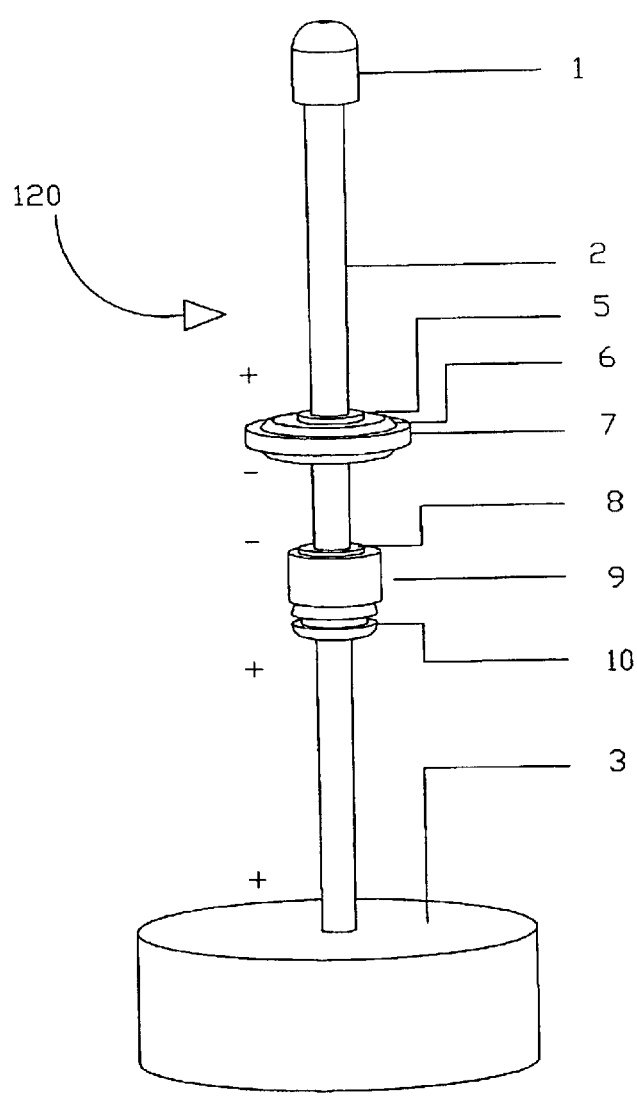
FIG. 8 is a perspective view of the assembled arrangement to demonstrate activation energy between the third annular magnet and the second annular magnet.
Figure 9:
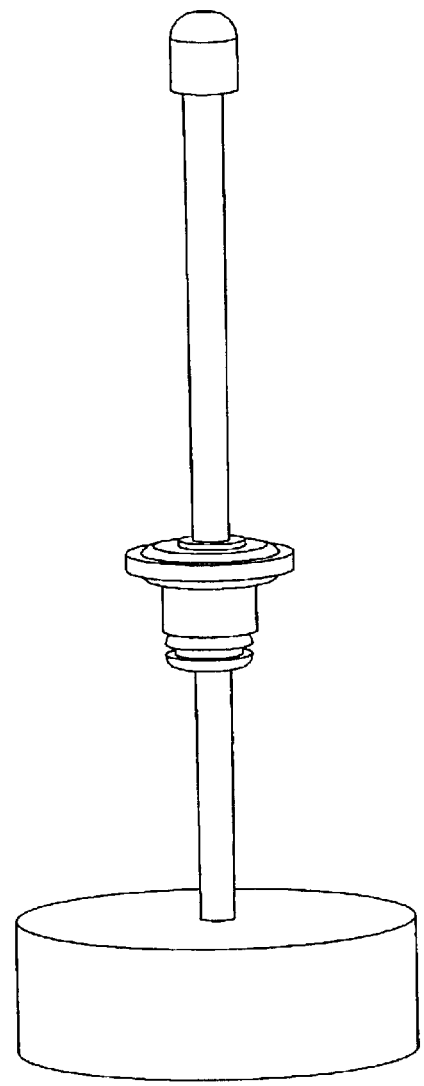
FIG. 9 is a perspective view of FIG. 8 after the completion of the exercise at which point the third annular magnet is bonded to the second annular magnet.
Figure 12:
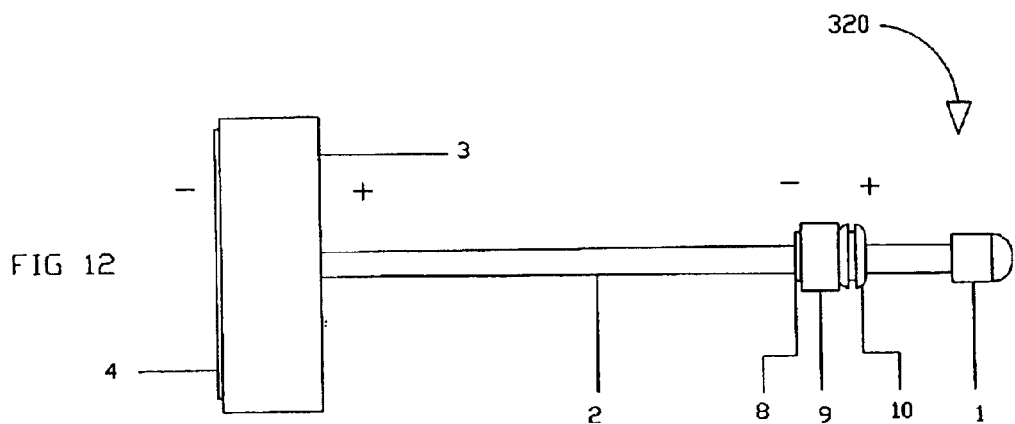
FIGS. 12, 13, 14, and 15 are a side elevation view of the setup used to demonstrate the potential energy of a covalent bond as a function of internuclear distance; and, FIG. 16 is a graph of activation energy, representing the experimental results of the student laboratory exercise.
Figure 13:
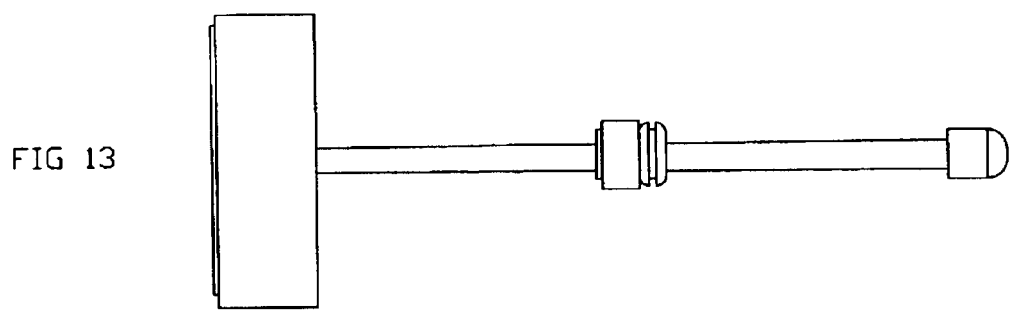
Figure 14:
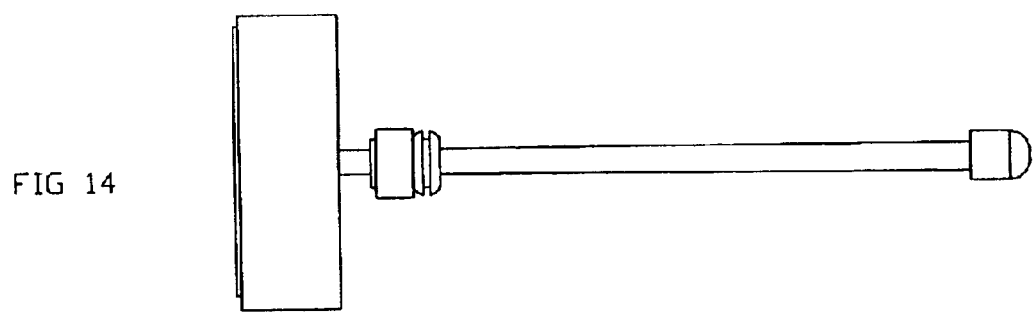
Figure 15:
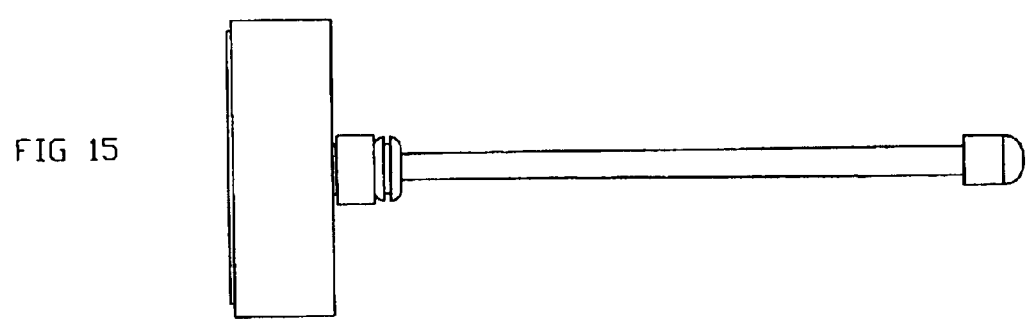

| A<br>Maximum drop<br>Height (cm) | B<br>Minimum drop<br>Height (cm) | C<br>Magnet assembly<br>Length (cm) | D<br>Height<br>Correction (cm) | E<br>Magnet assembly<br>Mass (kg) | F<br>Acceleration of<br>Gravity (m/s^2) | G<br>X axis (cm)<br>[B + D] | H<br>Y axis (cJ)<br>[A − B − C]*[E]*[F] |
|---|---|---|---|---|---|---|---|
| 11   | 6.8  | 1.7 | 1.05 | 0.018 | 9.8 | 7.85 | 0.44 |
| 12   | 6.1  | 1.7 | 1.05 | 0.018 | 9.8 | 7.15 | 0.74 |
| 13   | 5.55 | 1.7 | 1.05 | 0.018 | 9.8 | 6.6  | 1.01 |
| 14   | 5.1  | 1.7 | 1.05 | 0.018 | 9.8 | 6.15 | 1.27 |
| 15   | 4.7  | 1.7 | 1.05 | 0.018 | 9.8 | 5.75 | 1.52 |
| 16   | 4.3  | 1.7 | 1.05 | 0.018 | 9.8 | 5.35 | 1.76 |
| 17   | 4.05 | 1.7 | 1.05 | 0.018 | 9.8 | 5.1  | 1.98 |
| 18   | 3.85 | 1.7 | 1.05 | 0.018 | 9.8 | 4.9  | 2.20 |
| 19   | 3.55 | 1.7 | 1.05 | 0.018 | 9.8 | 4.6  | 2.43 |
| 20   | 3.3  | 1.7 | 1.05 | 0.018 | 9.8 | 4.35 | 2.65 |
| 21   | 3.1  | 1.7 | 1.05 | 0.018 | 9.8 | 4.15 | 2.86 |
| 22   | 2.85 | 1.7 | 1.05 | 0.018 | 9.8 | 3.9  | 3.08 |
| 23   | 2.7  | 1.7 | 1.05 | 0.018 | 9.8 | 3.75 | 3.28 |
| 24   | 2.55 | 1.7 | 1.05 | 0.018 | 9.8 | 3.6  | 3.48 |
| 25   | 2.4  | 1.7 | 1.05 | 0.018 | 9.8 | 3.45 | 3.69 |
| 26   | 2.25 | 1.7 | 1.05 | 0.018 | 9.8 | 3.3  | 3.89 |
| 27   | 2.1  | 1.7 | 1.05 | 0.018 | 9.8 | 3.15 | 4.09 |
| 28   | 1.95 | 1.7 | 1.05 | 0.018 | 9.8 | 3    | 4.30 |
| 29   | 1.8  | 1.7 | 1.05 | 0.018 | 9.8 | 2.85 | 4.50 |
| 30   | 1.7  | 1.7 | 1.05 | 0.018 | 9.8 | 2.75 | 4.69 |
| 31   | 1.5  | 1.7 | 1.05 | 0.018 | 9.8 | 2.55 | 4.90 |
| 32   | 1.4  | 1.7 | 1.05 | 0.018 | 9.8 | 2.45 | 5.10 |
| 33   | 1.3  | 1.7 | 1.05 | 0.018 | 9.8 | 2.35 | 5.29 |
| 34   | 1.1  | 1.7 | 1.05 | 0.018 | 9.8 | 2.15 | 5.50 |
| 35   | 0.85 | 1.7 | 1.05 | 0.018 | 9.8 | 1.9  | 5.72 |
| 36   | 0.5  | 1.7 | 1.05 | 0.018 | 9.8 | 1.55 | 5.96 |
| 36.2 | 0.35 | 1.7 | 1.05 | 0.018 | 9.8 | 1.4  | 6.02 |
| 36.3 | 0    | 1.7 | 1.05 | 0.018 | 9.8 | 1.05 | 6.10 | dropped, the second annular magnet 9 is captured by the first annular magnet 4. In other words the second annular magnet 9 will float above the first annular magnet 4 until the second annular magnet 9 is dropped from a high enough distance causing the two magnets to come together and form a bond illustrated in FIG. 7. The resulting maximum and minimum drop heights are recorded from the metric height scale 11 located inside rod 2. The center of mass of the second annular magnet 9 is arbitrarily assigned to be the location of the second annular magnet 9, to be thought of as a small particle. To obtain the values for the X-axis, the height correction is measured from the bottom of the second resilient grommet 10 to the estimated center of mass of the second annular magnet 9. The resulting height correction of about 1.05 (cm) is added to all the minimum drop height values to place the location of the second annular magnet 9 at the center of mass, refer to table 1. To obtain the values A second method for demonstrating activation energy, comprising only a qualitative demonstration involving the laws of physical chemistry, is illustrated in FIGS. 8, and 9. Setup 120 of the apparatus includes: A first annular magnet 4 having a first pole designated by a plus sign, a second pole designated by a minus sign, and a central axis 12. A rod 2 extending upward from the first annular magnet 4, aligned with the central axis 12, having a height scale 11. A second annular magnet 9 having a first pole designated by a plus sign, a second pole designated by a minus sign, and a central aperture dimensioned to slidably receive the rod 2. A third annular magnet 7 having a first pole designated by a plus sign, a second pole designated by a minus sign, and a central aperture consisting of a nylon bearing 5 and a third resilient grommet 6 dimensioned to slidably receive the rod 2. FIG. 4 shows each component labeled with a number. The second annular magnet 9 is placed on the rod 2 so that its first pole is disposed toward the first pole of the first annular magnet 4, and the second annular magnet 9 is suspended above the first annular magnet 4. The third annular magnet 7 is placed on the rod 2 so that its second pole is disposed toward the second pole of the second annular magnet 9, and the third annular magnet 7 is suspended above the second annular magnet 9. The exercise begins by raising the third annular magnet 7 a height above the second annular magnet 9 then dropping the third annular magnet 7 and observing that the third annular magnet 7 falls toward the second annular magnet 9. For each repetition the height is increased, until when dropped, the third annular magnet 7 is captured by the second annular magnet 9; thus, demonstrating the phenomenon of activation energy between the second and third annular magnets FIG. 9.

A method for demonstrating the SN2 reaction is illustrated in FIGS. 10, and 11. Setup 220 of the apparatus includes: A first annular magnet 4 having a first pole designated by a plus sign, a second pole designated by a minus sign, and a central axis 12. A rod 2 extending upward from the first annular magnet 4, aligned with the central axis 12, having a height scale 11. A second annular magnet 9 having a first pole designated by a plus sign, a second pole designated by a minus sign, and a central aperture dimensioned to slidably receive the rod 2. A third annular magnet 7 having a first pole designated by a plus sign, a second pole designated by a minus sign, and a central aperture dimensioned to slidably receive the rod 2. The third annular magnet 7 is placed on the rod 2 so that its first pole is disposed toward the first pole of the first annular magnet 4. The third annular magnet 7 is pushed down until the first annular magnet 4 captures it and holds there on its own, refer to FIG. 10. The second annular magnet 9 is placed on the rod 2 so that it floats suspended above the third annular magnet 7 whereby its first pole is disposed toward the second pole of the third annular magnet 7. The second annular magnet 9 is raised above the third annular magnet 7 and allowed to drop observing that the second annular magnet 9 falls toward the third annular magnet 7. For each repetition the height is increased, the repetition continuing until when dropped, the second annular magnet 9 is captured by the third annular magnet 7, and both the second annular magnet 9 and the third annular magnet 7 are suspended above the first annular magnet 4, refer to FIG. 11. The second annular magnet 9 can be thought of as the nucleophile while the third annular magnet 7 can be thought of as the carbon atom. The aluminum base 3 containing the first annular magnet 4 is the leaving group. Although the base 3 does not actually leave, it is resting on a tabletop, the base 3 can still be thought of as the leaving group. This works because motion is relative, for the nucleophile and the carbon atom bond together and these two units move upward leaving the base. Compare and contrast FIGS. 10 and 11 with FIG. 3.

A method for demonstrating a covalent bond is illustrated in FIGS. 12 through 15. Setup 320 of the apparatus includes: A first annular magnet 4 having a first pole designated by a plus sign, a second pole designated by a minus sign, and a central axis 12. A rod 2 extending upward from the first annular magnet 4, aligned with the central axis 12, having a height scale 11. A second annular magnet 9 having a first pole designated by a plus sign, a second pole designated by a minus sign, and a central aperture dimensioned to slidably receive the rod 2. The second annular magnet 9 is placed on the rod 2 so that its second pole is disposed toward the first pole of the first annular magnet 4. The second annular magnet 9 is placed far away from the first annular magnet 4 resulting in no attraction between the second annular magnet 9 and the first annular magnet 4, refer to FIG. 12. The second annular magnet 9 is gradually moved toward the first annular magnet 4, an attraction between the second annular magnet 9 and the first annular magnet 4 occurs FIG. 13. This attraction first increases and then decreases until an equilibrium state is achieved wherein there is no attraction or repulsion between the second annular magnet 9 and the first annular magnet 4. At this point the second annular magnet 9 is suspended a distance above the first annular magnet 4 FIG. 14. In this state of equilibrium the distance between the base 3 and the second annular magnet 9 would be the bond length. At this point the bond is the most stable. Continuing to move the second annular magnet 9 toward the first annular magnet 4 causes an increase in repulsion between the second annular magnet 9 and the first annular magnet 4 FIG. 15. Compare and contrast FIGS. 12 through 15 with FIG. 2.

Referring to the apparatus for demonstrating laws of physical chemistry, FIG. 4 illustrates each component labeled with a number. FIGS. 5 through 15 show the components assembled. The third annular magnet 7 is fitted with a central aperture consisting of a third resilient grommet 6 and a nylon bearing 5. The second annular magnet 9 is fitted with a central aperture consisting of a nylon bearing 8 held in place with a second resilient grommet 10. The first annular magnet 4 is permanently bonded to aluminum base 3. Acrylic rod 2 is fitted with a metric height scale 11. The bottom end of rod 2 is press fit into the center hole of the aluminum base 3 and the top end is fitted with end cap 1. The second and third annular magnets ride up and down on the rod 2. All of the magnets are aligned with the central axis 12. The magnets will repel each other, yet when brought close together they will attract each other and come together to form a bond. The size and shape of the annular magnets produce this unusual effect. For the following analogy consider the interaction between the third annular magnet 7 and the second annular magnet 9 FIGS. 8 and 9. At a distance the two magnets repel each other because the first pole of one magnet opposes the first pole of the other magnet. However, when the magnets are brought close together the first pole of one magnet begins to attract the second pole of the other magnet. One can think of a doughnut hole being fitted into a doughnut. The third annular magnet 7 can be thought of as the doughnut and the second annular magnet 9 as the doughnut hole. The larger the dissimilarity in ring diameter between the two interacting magnets the more pronounced the effect will be. The first annular magnet 4 has a first outer diameter and a first inner diameter. The second annular magnet 9 has a second outer diameter and a second inner diameter. The third annular magnet 7 has a third outer diameter and a third inner diameter. The first outer diameter being greater than the third outer diameter, and the third outer diameter being greater than the second outer diameter. The third outer diameter is approximately equal to the first inner diameter. The dimensions of one our prototypes that gave us the best results are the following: The first outer diameter is about 2.75 inches and the first inner diameter is about 1.23 inches. The second outer diameter is about 0.75 inches and the second inner diameter is about 0.3125 inches. The third outer diameter is about 1.25 inches and the third inner diameter is about 0.95 inches. The first annular magnet 4 has a thickness of about 1.00 inches. The second annular magnet 9 has a thickness of about 0.375 inches. The third annular magnet 7 has a thickness of about 0.125 inches.

The preferred embodiments of the invention described herein are exemplary and numerous modifications, dimensional variations, and rearrangements can be readily envisioned to achieve an equivalent result, all of which are intended to be embraced within the scope of the appended claims.

We claim:

1. Method for demonstrating activation energy, comprising:
   (a) providing apparatus for demonstrating laws of physics, including:
      a first annular magnet having a first pole, a second pole, and a central axis;
      a rod extending upward from said first annular magnet, said rod aligned with said central axis, said rod having a height scale;
      a second annular magnet having a first pole, a second pole, and a central aperture dimensioned to slidably receive said rod;
   (b) placing said second annular magnet on said rod so that said first pole is disposed toward said first pole of said first annular magnet, and said second annular magnet is suspended above said first annular magnet;
   (c) raising said second annular magnet a height above said first annular magnet;
   (d) dropping said second annular magnet and observing that said second annular magnet falls toward said first annular magnet and is then repealed back up said rod;
   (e) repeating steps (c) and (d) wherein for each repetition said height is increased, said repetition continuing until when dropped, said second annular magnet is captured by said first annular magnet.

2. The method of claim 1, further including:
   in step (e), using said height scale to observe a maximum drop height at which said second annular magnet is repealed back up said rod, and also observing a minimum height reached by said second annular magnet.

3. The method of claim 2, further including:
   in step (a), providing two washers having an aperture dimensioned to snuggly receive said rod, so that said washers may be selectively placed at any position along said rod and remain in said placed position;
   prior to step (b), placing one of said washers on said rod;
   after step (b), placing the other of said washers on said rod; and,
   in step (e), using said washers to mark said maximum and minimum heights.

4. Method for demonstrating activation energy, comprising:
   (a) providing apparatus for demonstrating laws of physics, including:
      a first annular magnet having a first pole, a second pole, and a central axis;
      a rod extending upward from said first annular magnet, said rod aligned with said central axis, said rod having a height scale;
      a second annular magnet having a first pole, a second pole, and a central aperture dimensioned to slidably receive said rod;
      a third annular magnet having a first pole, a second pole, and a central aperture dimensioned to slidably receive said rod;
   (b) placing said second annular magnet on said rod so that said first pole is disposed toward said first pole of said first annular magnet, and said second annular magnet is suspended above said first annular magnet;
   (c) placing said third annular magnet on said rod so that said second pole is disposed toward said second pole of said second annular magnet, and said third annular magnet is suspended above said second annular magnet;
   (d) raising said third annular magnet a height above said second annular magnet;
   (e) dropping said third annular magnet and observing that said third annular magnet falls toward said second annular magnet and is then repealed back up said rod;
   (f) repeating steps (d) and (e) wherein for each repetition said height is increased, said repetition continuing until when dropped, said third annular magnet is captured by said second annular magnet.

5. The method of claim 4, further including:
   in step (f), using said height scale to observe a maximum drop height at which said third annular magnet is repealed back up said rod.

6. Method for demonstrating a SN2 reaction, comprising:
   (a) providing apparatus for demonstrating laws of physics, including:
      a first annular magnet having a first pole, a second pole, and a central axis;
      a rod extending upward from said first annular magnet, said rod aligned with said central axis, said rod having a height scale;
      a second annular magnet having a first pole, a second pole, and a central aperture dimensioned to slidably receive said rod;
      a third annular magnet having a first pole, a second pole, and a central aperture dimensioned to slidably receive said rod;
   (b) placing said third annular magnet on said rod so that said first pole is disposed toward said first pole of said first annular magnet, and said third annular magnet is suspended above said first annular magnet;
   (c) placing said second annular magnet on said rod so that said first pole is disposed toward said second pole of said third annular magnet, and said second annular magnet is captured by said third annular magnet;
   (d) pushing said third annular magnet down until it is captured by said first annular magnet, and said second annular magnet is suspended above said third annular magnet;
   (e) raising said second annular magnet a height above said third annular magnet;
   (f) dropping said second annular magnet and observing that said second annular magnet falls toward said third annular magnet and is then repealed back up said rod;
   (g) repeating steps (e) and (f) wherein for each repetition said height is increased, said repetition continuing until when dropped, said second annular magnet is captured by said third annular magnet, and both said second annular magnet and said third annular magnet are suspended above said first annular magnet.

7. The method of claim 6, further including:
   in step (g), using said height scale to observe a maximum drop height at which said second annular magnet is repealed back up said rod.

8. Method for demonstrating a covalent bond, comprising:
   (a) providing apparatus for demonstrating laws of physics, including:
      a first annular magnet having a first pole, a second pole, and a central axis;
      a rod extending upward from said first annular magnet, said rod aligned with said central axis, said rod having a height scale;
      a second annular magnet having a first pole, a second pole, and a central aperture dimensioned to slidably receive said rod;

(b) placing said second annular magnet on said rod so that said second pole is disposed toward said first pole of said first annular magnet;

(c) moving said second annular magnet away from said first annular magnet and noticing there is no attraction between said second annular magnet and said first annular magnet;

(d) gradually moving said second annular magnet toward said first annular magnet and noticing that an attraction between said second annular magnet and said first annular magnet first increases and then decreases until an equilibrium state achieved wherein there is no attraction or repulsion between said second annular magnet and said first annular and said second annular magnet is suspended a distance above said first annular magnet; and, (e) continuing to move said second annular magnet toward said first annular magnet and noticing an increasing repulsion between said second annular magnet and said first annular magnet.

9. Apparatus for demonstrating laws of physics, comprising:

a first annular magnet having a first pole, a second pole, and a central axis;

a rod extending upward from said first annular magnet, said rod aligned with said central axis, said rod having a height scale;

a second annular magnet having a first pole, a second pole, and a central aperture dimensioned to slidably receive said rod;

a third annular magnet having a first pole, a second pole, and a central aperture dimensioned to slidably receive said rod;

so that said second and third annular magnets may be slidably placed upon said rod and magnetically interact with said first annular magnet;

said first annular magnet having a first outer diameter and a first inner diameter;

said second annular magnet having a second outer diameter and a second inner diameter;

said third annular magnet having a third outer diameter and a third inner diameter; and, said first outer diameter being greater than said third outer diameter, and said third outer diameter being greater than said second outer diameter.

10. Apparatus according to claim 9, further including:

said third outer diameter approximately equal to said first inner diameter.

11. Apparatus according to claim 9, further including:

said first outer diameter being about 2.75 inches;

said first inner diameter being about 1.23 inches;

said second outer diameter being about 0.75 inches;

said second inner diameter being about 0.3125 inches;

said third outer diameter being about 1.25 inches; and, said third inner diameter being about 0.95 inches.

12. Apparatus for demonstrating laws of physics, comprising:

a first annular magnet having a first pole, a second pole, and a central axis;

a rod extending upward from said first annular magnet, said rod aligned with said central axis, said rod having a height scale;

a second annular magnet having a first pole, a second pole, and a central aperture dimensioned to slidably receive said rod;

a third annular magnet having a first pole, a second pole, and a central aperture dimensioned to slidably receive said rod;

so that said second and third annular magnets may be slidably placed upon said rod and magnetically interact with said first annular magnet;

said first magnet having a thickness of about 1.00 inches;

said second magnet having an thickness of about 0.375 inches; and, said third magnet having a thickness of about 0.125 inches.

13. Apparatus for demonstrating laws of physics, comprising:

a first annular magnet having a first pole, a second pole, and a central axis;

a rod extending upward from said first annular magnet, said rod aligned with said central axis, said rod having a height scale;

a second annular magnet having a first pole, a second pole, and a central aperture dimensioned to slidably receive said rod;

a third annular magnet having a first pole, a second pole, and a central aperture dimensioned to slidably receive said rod;

so that said second and third annular magnets may be slidably placed upon said rod and magnetically interact with said first annular magnet;

said first annular magnet having a first outer diameter and a first inner diameter;

said second annular magnet having a second outer diameter and a second inner diameter;

said third annular magnet having a third outer diameter and a third inner diameter;

said first outer diameter being greater than said third outer diameter, and said third outer diameter being greater than said second outer diameter;

said third outer diameter approximately equal to said first inner diameter;

a second resilient grommet connected to said second magnet;

a third resilient grommet connected to said third magnet; and, at least one washer having an aperture dimensioned to snuggly receive said rod, so that said washer may be selectively placed at any position along said rod and remain in said placed position.

* * * * *